Oct. 21, 1969    A. M. CASTELLO-BRANCO E NEVES    3,473,851

SAFETY VALVE FOR A HYDRAULIC SYSTEM

Filed April 1, 1968      3 Sheets-Sheet 1

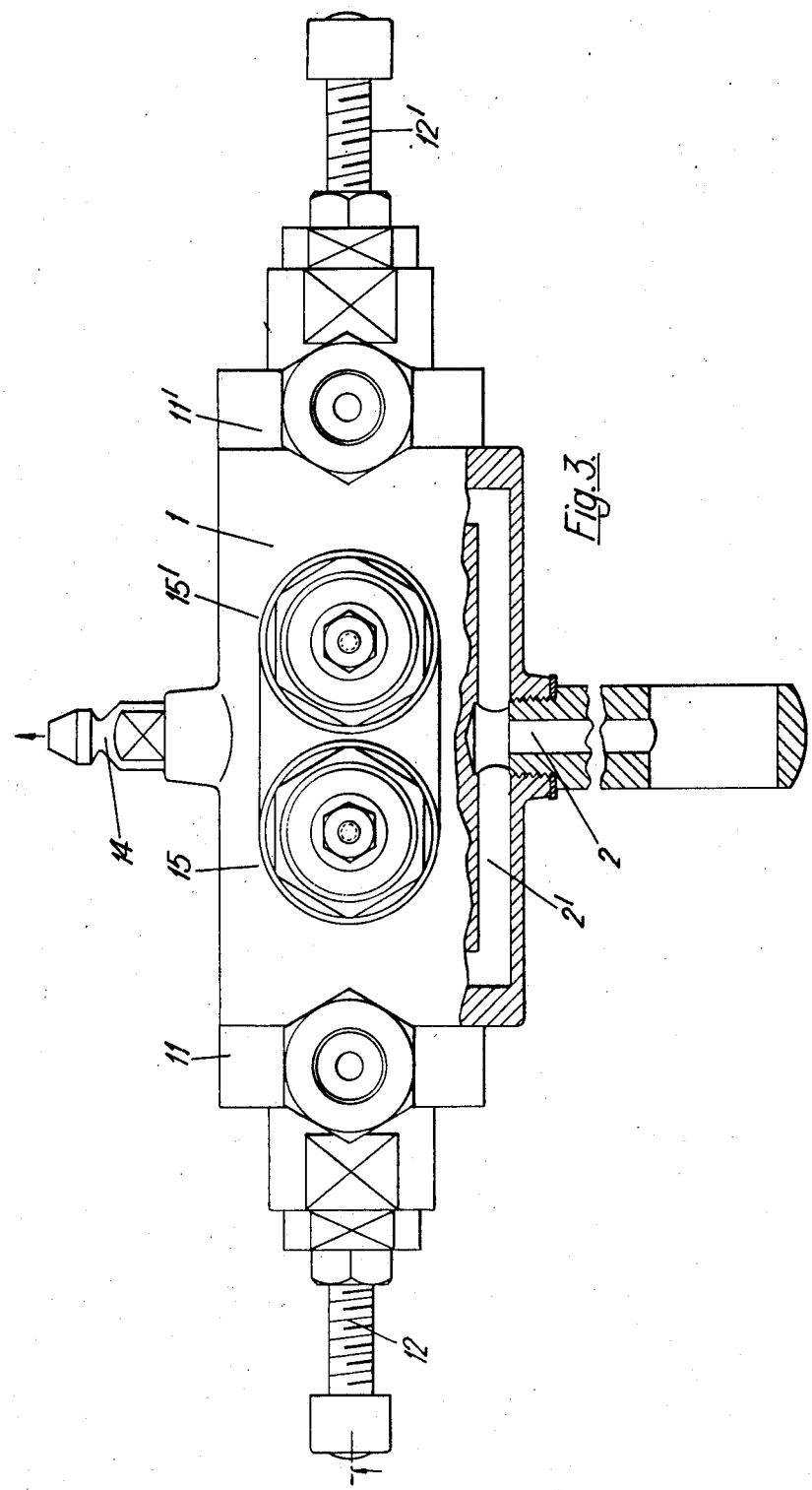

United States Patent Office 3,473,851
Patented Oct. 21, 1969

1

3,473,851
SAFETY VALVE FOR A HYDRAULIC SYSTEM
Antonio Maria Castello-Branco e Neves, Dominguiso,
Tortosendo, Covilha, Portugal
Filed Apr. 1, 1968, Ser. No. 717,753
Claims priority, application Portugal, Mar. 31, 1967,
47,456
Int. Cl. B60t 15/36
U.S. Cl. 303—84                               12 Claims

ABSTRACT OF THE DISCLOSURE

A safety valve which can be inserted in a hydraulic system having a supply line of a pressure fluid (positive or suction) and two operating lines connected to utilization devices. The valve has a displaceable piston which is balanced by the pressure of the fluid passing to the operating lines to normally permit unaffected operation when the pressures are equal. However, when a rupture or leakage occurs in one of the operating lines, the piston is displaced to automatically isolate this line while permitting normal operation of the other line. The valve also includes a signal device which indicates which of the lines has been put out of service.

SUMMARY OF THE INVENTION

This invention relates to a safety valve which can be incorporated in a hydraulic system having a supply line and at least two outlet lines to close an outlet line which loses pressure while permitting unaffected operation of the other lines and also to indicate which outlet line has been put out of service.

It is known to equip motor vehicles with brakes at the wheels, using the well-known hydraulic brake system for smaller vehicles and compressed air or vacuum brake systems for the larger vehicles.

Such brake systems are characterized by their sturdiness, efficiency, mechanical simplicity, economy of maintenance, ease of installation and safe operation. However, these systems are also subject to damage or failure. Moreover, because of their good mechanical characteristics, periodic inspections are generally neglected. In this way, the various elements of these systems, which are subject to wear, to chemical and atmospheric agents, to shocks and vibrations and also to friction with other parts, are gradually weakened without the drivers being aware of this condition.

Among the components of the pressure lines (hydraulic, compressed air, or vacuum) one of those most subject to failures is the tubing or lines, so that the rupture of any line results in leakage of fluid and hence complete loss of operability of the entire brake system.

Frequently, the rupture of the weakened lines occurs at the moment when the driver of the vehicle must brake suddenly, so that the dramatic and paradoxical situation occurs when a driver, needing the powerful and rapid reaction of the brakes, only learns that they are inoperative.

In view of the seriousness of the accidents which so often occur due to brake failure, applicant has devised a valve which completely avoids the disasters caused by defects or failures in hydraulic, compressed air, or vacuum brakes, by providing separation of the pressure lines corresponding to each pair of wheels, thus offering the possibility of maintaining in service the brake system of at least one pair of coaxial wheels when, due to failure of any component, the brake system of another pair of wheels is inoperative.

The valve comprises in a single unit, mechanical elements which in case of damage, provide for individual isolation of the two pressure lines of the brake system of a vehicle. The valve also has a visual signalling system which indicates to the driver which wheel has inoperative brakes.

This signalling is of great importance since, in such conditions, the difference of braking efficiency of the front or rear wheels is well known.

The value of the driver's being advised of the particular brake which is inoperative will be better appreciated if it will be recalled that at the moment of braking approximately 70% of the total weight can be on the front wheels while only 30% is on the rear wheels.

As a result, the front tires increase their contact area with the ground by flattening out (compression against the pavement) and the force of adhesion also increases. For this reason, brake devices are usually constructed so that a more intensive braking is obtained on the front wheel assembly, taking advantage of the greater adhesion of the front tires. This greatly reduces the possibility of dangerous brake locking.

It is therefore clear that it is extremely important to know, in case of failure, in which of the two lines the failure occurred. For this, an indicating mechanism is provided, which may be a visual indicator optionally supplemented by an alarm system.

In should be noted, however, that the braking efficiency of a single pair of coaxial wheels reaches a percentage (about 80%) which perfectly insures steady driving, within ample safety limits, in relation to the speed of the vehicle.

The safety valve has much broader application than the vehicle brake systems hereinabove mentioned, and is adapted to compressed air, hydraulic or vacuum systems of brakes of railroad trains, including steam locomotives, self-propelling diesel electrics, electric cars, trolleys and the like. In such systems breakage of any of the brake lines of said vehicles will not result in serious accidents such as derailments and the like.

If in a railroad train equipped with the safety valve, a failure or leakage should occur in one of the tubes which interconnect the cars, that valve will immediately become operative and with absolute certainty will cut off the inflow of fluid to the car on which the leakage occurred, isolating the rest of the train, which will remain with its brakes intact and in normal operating condition. By means of a suitable signalling system, the conductor or engineer will immediately be appraised of the fact that a failure in the brakes has occurred, and moreover, in which line it occurred.

Another advantage of the double safety valve, which is of great importance, resides in its application in airplanes.

As is known, military or commercial airplanes have a number of hydraulically actuated devices which have a central hydraulic system from which the fluid is pumped to the various systems. For example, the brake system of the wheels and the systems for raising and retracting the landing gear and steering gear are connected to a common pressure source. The valve of the present invention operates to close a damaged line while the others remain in normal operating condition. Moreover, the pilot will be appraised if the hydraulically controlled devices are all operative or if a failure has occurred in any of the supply lines.

According to the invention the safety valve comprises a cylindrical body with opposite ends closed by threaded caps. A piston is slidably mounted in the body and has a balanced position under the action of two helical springs and the pressure of the fluid itself at the outlets.

The normal or balanced position of said piston creates two chambers, defined by the threaded caps and by truncated cone-shaped ends of said piston. These chambers are interconnected by an inlet channel, with which they communicate by means of feed orifices or ports.

Fluid supply is effected through an inlet having a threaded bore in the center of the cylindrical body and connected to a central pressure distributor (a pump, in hydraulic systems, and feed valves in a compressed air or vacuum system).

The caps of the cylindrical body each has a channel with a threaded bore serving as an outlet, these bores serving to establish the connection to the conduits of the control systems of the wheel brakes or to the fluid distribution conduits for the various devices which they feed. These caps further have a screw, with sealing cones, the purpose of which will be described hereafter.

In the cylindrical body, and in a position diametrically opposite the inlet connected to the pressure distributor, there is a bleeder screw in the models adapted for hydraulic lines, which is in communication with the central body. On either side of this screw, a mechanical-electrical device is mounted which serves to fix the position of the piston in its displaced position, and to establish closure of a switch which controls activation of a signal device indicating which line is inoperative. Because the valve of the invention is a double action valve, it is possible to obtain an entirely symmetrical construction.

Tests made have shown that the device is equally efficient in the case of hydraulic brakes, as in compressed air or vacuum brakes, as well as in industrial distribution lines.

However, to facilitate the description, reference will be made exclusively to use in a brake system of the first type, that is, hydraulic brakes, since the mode of operation in the other types is exactly the same.

In normal use, the fluid, which completely fills the hydraulic system, is pressurized by the displacement of the plunger of the pump of the brake system of the vehicle (master cylinder) and the fluid acts with equal pressures on the ends of the piston of the valve, the piston therein remaining in its neutral position under the balanced action of the springs.

Thus the fluid travels through the brake lines and acts on the plungers of the control cylinders of the brakes of each wheel, as if the valve did not exist.

A rupture in a hydraulic line causes a reduction of pressure in a respective line, and hence the piston is displaced because of the unbalanced pressure exerted on its ends (pressure of the fluid plus that of the spring). The piston displacement overcomes the resistance of the helical spring, whose tension is weak, thus stopping the outflow of fluid to the wheel assembly where the rupture occurred.

Under these conditions, the return of the fluid to the cylinder of the main pump of the brake does not take place fast enough or in sufficient quantity to compensate the displacement of the respective plunger, and a vacuum is created, which is compensated by the fluid contained in the reservoir attached to the brake pump, which is at least half filled with liquid. This compensation or self-feeding system, present in all hydraulic systems, will permit using the brake safely, even when the quantities of fluid displaced in previous breaking operations have not completely returned to the master cylinder of the main pump.

BRIEF DESCRIPTION OF THE DRAWING

FIGURE 3 is a top view of the valve with the inlet and feed channels being in section; and FIGURE 4 is an end view of the valve.

DETAILED DESCRIPTION

Figure 2:
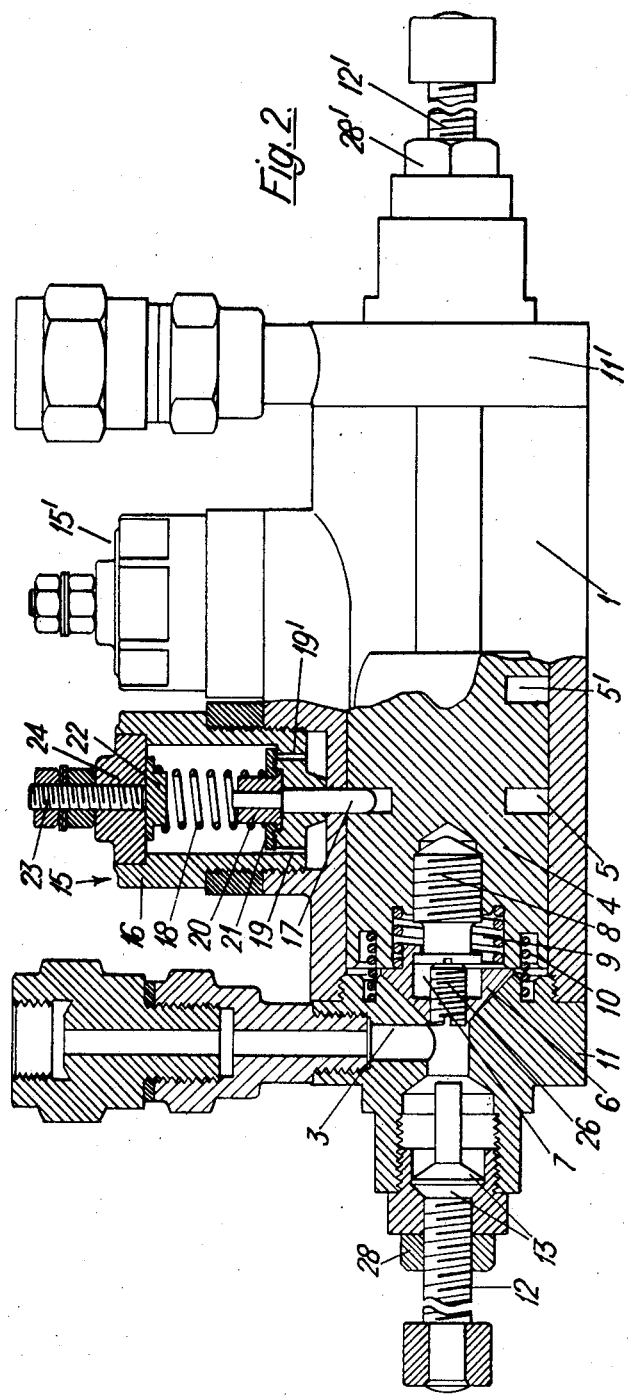
FIGURE 2 is a side view of the valve of FIG. 1 turned through an angle of 90° and shown partly in section in a condition where there is a break in a line.

The safety valve is composed of a cylindrical body 1 having an inlet channel 2 which communicates with a feed channel 2' and with two outlet channels 3 (FIG. 2). The channels 2 and 3 are equipped with threaded bores.

The inlet channel 2 and the outlet channels 3 are connected, respectively, to the master cylinder and to the front and rear wheel brake lines. In industrial and like applications, the inlet channel is connected to the pressure distributor and the outlet channels to the feed branches of the various utilization devices.

Inside the cylindrical body is a piston 4, which has a cylindrical surface with two annular recesses 5, 5'.

The piston 4 has ends formed by truncated cone-shaped projections 6, 6', which may be integral with the body of the piston.

However, in order to avoid the consequences of possible contamination of the fluid by atmospheric dust or other agents that may be introduced in the fluid (hydraulic, compressed air, or vacuum), or to interfere with perfect seating of the truncated cone-shaped heads in respective seats, these projections are mounted in the body of the piston, without clearance, and are pivotable and self-adjusting in their seats.

To achieve this, the truncated cone-shaped projections 6, 6' have respective cavities 7, 7' at their bases, in which are accommodated the heads of screws 8, 8' which are threadably engaged in the flat ends of the piston 4. Two helical springs 9, 9', of a diameter greater than that of the screws 8, 8', surround the screws and maintain the truncated cone-shaped heads 6 and 6' in adjusted position relative to the bases of the piston 4. As shown in FIG. 2 the heads 6, 6' are each provided with a lug which engages a head on the respective screws 8, 8' to prevent uncoupling thereof while permitting relative angular and axial displacement therebetween against the opposition of springs 9, 9'.

The springs 9 and 9' have a predetermined tension which is adjusted at the time of the manufacture and installation of the valves by means of the two threaded screws 8, 8' so that the heads 6, 6' can undergo angular movements in order to permit them to automatically adjust to the position of the seat and thereby provide a perfect seal when the heads 6 and 6' are seated.

The tension of said springs is adjusted through a threaded central orifice in the truncated cone-shaped heads of the piston. When the adjustment of the springs is completed, small headless screws 26, 26' are engaged in the orifices of the truncated cone-shaped heads, in order to cover the adjustment screws 8 and 8'.

Two helical springs 10 and 10' are interposed between caps 11, 11' of the cylindrical body 1 and the ends of the piston 4 to maintain the latter in a position which corresponds to the normal operation of the valve in a hydraulic line without leaks.

Each of the caps 11, 11' is provided with a fastening screw 12, 12', extending along the longitudinal axis of the valve and adapted to place the piston 4 in the normal or neutral position when the respective line or tubing must be bled. These fastening screws have at their tip, two sealing cones 13, 13', one being for use when the screw is in a more inserted position and the other in a more withdrawn position. These sealing cones fit into corresponding seats, the one in the advanced position being in the threaded cap and the other in the withdrawn position being in the cap shell.

In hydraulic systems, the outer wall of the cylindrical body 1 is provided with a bleed screw 14 in a position diametrically opposite the inlet channel 2.

On either side of the screw 14 are inserted mechanical-electrical devices 15, 15' which have the dual function of immobilizing the piston when the latter is displaced due to breakage of a tubing, and of establishing an electric contact intended to illuminate a signal lamp corresponding to the wheel assembly on which the brake is inoperative.

The mechanical-electric devices 15, 15' are each constructed as shown in FIG. 2 with a small cylinder 16 threadably inserted into one of the side walls of the body 1 of the valve. In the body of the valve are provided holes to permit the longitudinal displacement of stems 17 which, by means of helical springs 18 are urged against the outer surface of the piston 4.

At the bottom of the small cylinder 16 are two symmetrical holes 19, 19' of suitable diameter, which permit the free circulation of the fluid in the interior of the small cylinder 16, thus eliminating the pressure which the fluid might exert in the interior of the mechanical-electrical device in case it is introduced therein through any space between the stem 17 and the corresponding hole, despite the very small tolerance of fit between these parts.

Said stem 17 is electrically insulated by means of a bushing 20 and the assembly of both is secured to a metal disk 21 having concentric annular recesses on its lower face, which fit into similar recesses in the base on which it rests. The disk 21 is secured on bushing 20 so as to be normally out of contact with housing 16 as shown by the spacing between the outer edge of disk 21 and housing 16 in FIG. 2.

The annular recesses have a profile of sawtooth shape with teeth of very acute angle so as to avoid the accumulation of droplets of fluid (oil or water), as this would prevent the establishment of a perfect electric contact.

The lower end of the helical spring 18 embraces the insulating bushing 20 and rests on the metal disk 21. The opposite end engages the head 22 of a connecting terminal 23 screwed into a cap 24 of insulating material.

At the end of said terminal 23 are applied two metal washers and two nuts adapted to fix an electric cable which is connected to a signal lamp on the instrument panel of the vehicle.

The signalling contact is established when the piston 4 is displaced, due to a rupture of a brake line, and the stem 17 urged by the spring 18 enters the annular recess 5 on the cylindrical surface of said piston, forcing the metal disk 21 to fit on the base of cylinder 16.

The cylindrical body of the mechanical-electrical device 15 or 15' screwed into the valve body is connected to one of the terminals of an electric current source, the other terminal being connected to the terminal which feeds the signal lamp. The discs and cylinder bases of the devices 15 and 15' thus serve as switch means to control operation of the signal lamps in response to displacement of the piston 4.

When the valve is in normal operation, the brake fluid fills the main pump of the brake system (master cylinder), the tubing which connects the pump to the inlet channel 2, the feed channel 2', and the end chambers 25 and 25', through the feed orifices 27 and 27', and the tubing which connects the outlet channels 3 to the control cylinders of the wheel brakes.

Figure 1:
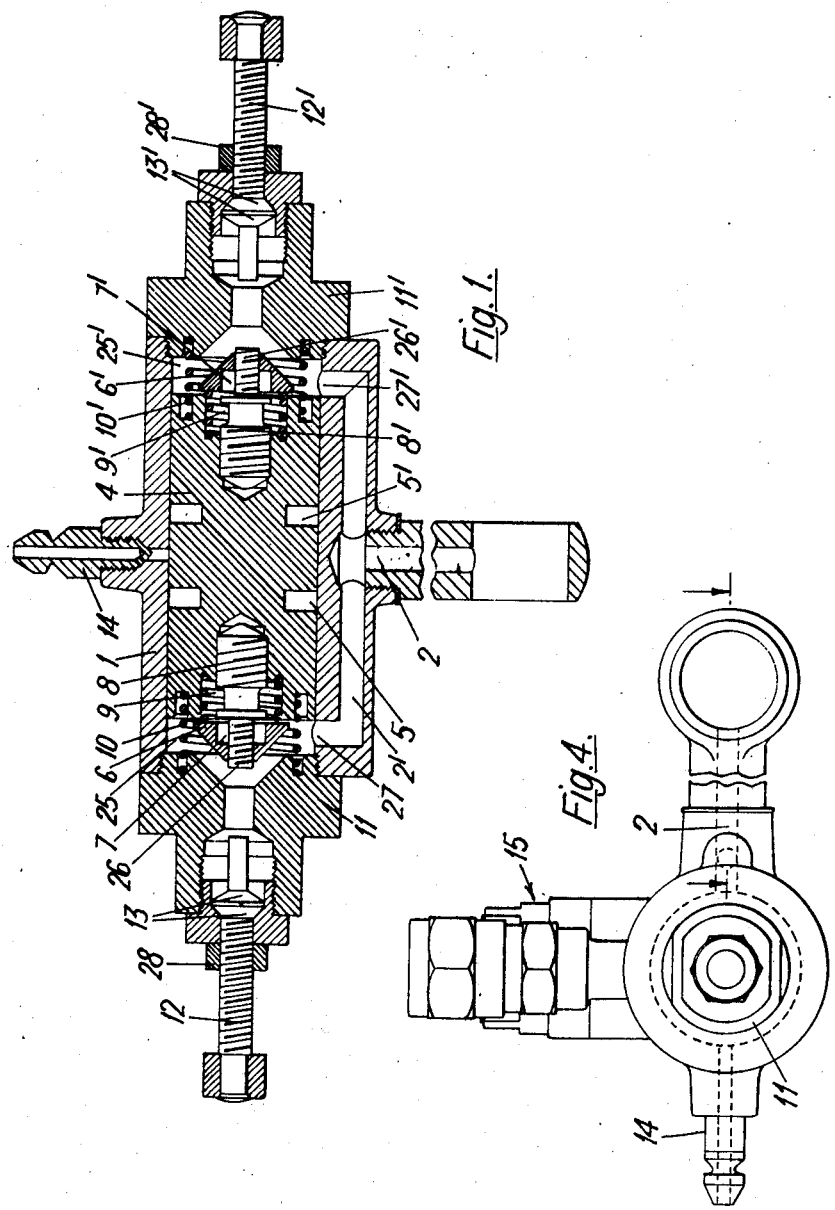
FIGURE 1 is a longitudinal sectional view of a valve according to the invention in normal operating condition.

Thus, when the brake pedal is actuated, the piston of the master cylinder exerts pressure on the fluid to act on the plungers of the control cylinders of the brakes, to effect a braking function. The valve is passive and the operation is effected as if the valve did not exist, since the fluid exerts equal pressures in the end chambers, and consequently the piston remains immovable (FIG. 1).

Let us now suppose (FIG. 2) that damage occurs (rupture or the like) at a point of the system, for example, in the tubing connected to the outlet channel 3, which necessarily produces a leakage of fluid. As a direct consequence of this damage, the pressure prevailing in the chamber 25 which communicates with that tubing will be reduced which cannot be instantly compensated by the fluid coming from the master cylinder and which enters the chamber through the feed orifice.

Under these conditions, and since the cross-section of the feed channel is much smaller than the surface of the piston 4, the pressure reduction results in an imbalance in the pressures to which the piston was subjected before the damage, so that the piston is displaced and closes the feed orifice 27.

As the plunger of the master cylinder continues to exert pressure on the fluid, the difference of pressures in the end chamber 25 and in the diametrically opposite chamber 25' will continue to increase until the pressure acts exclusively through the latter chamber (whose capacity will be increased by the displacement of the piston) on the truncated cone-shaped end 6' of the piston. In this way the cone-shaped end 6 is rapidly pushed toward its seat, hermetically closing the passage of fluid toward the damaged tubing which will be out of service, whereas the tubing connected to the other outlet channel continues to permit normal breaking of the associated wheel assembly.

When the piston reaches its displaced position, the stem 17, under the action of the spring 18, enters the annular recess 5 of the piston, immobilizing it. At the same time the metal disc 21, integral with the stem 17, establishes contact with its seat, closing the electric circuit of the signal lamp.

When this lamp is illuminated, it indicates the corresponding damaged tubing, and hence the respective wheel assembly out of service. In industrial and other installations, the signal lamp indicates which is the damaged line and, of course, the one out of service.

As there is a signal lamp for each tubing, the identification of the wheel assembly which is without brakes can be done by marking the lamps with conventional indicia.

The same criterion may be adopted for the great variety of industrial applications, such as airplanes, trains, electric cars, locomotives, etc.

To return the valve to normal operating conditions, the piston 4 must be displaced to its original position, and for this purpose the stem of the mechanical-electrical device 15 which is introduced in the annular recess 5 must be retracted by unscrewing said device. The screw 12 is then advanced to displace the piston until the sealing cone 13 of the screw is fitted in its respective seat. Simultaneously the fastening screw 12' in the opposite cap 11' of the cylindrical body is advanced until its cone also introduces itself in the respective seat. In this way the piston remains immovable, in order then to proceed with the bleeding of the system in hydraulic systems.

As can be seen from what has just been stated, the screws 12 and 12' are maintained in the advanced positions while the bleeding of the tubing connected to the outlet channel 3 is effected, after the damage has been repaired. During this operation, the sealing cones 13 and 13' are fitted in their seats, preventing any escape of fluid or entrance of air.

When the bleeding has been completed, the screws 12, 12' are unscrewed and brought to their retracted position.

For reasons of safety and to prevent the screws 12, 12' from displacing their sealing cones from the respective seats, lock nuts 28 and 28' have been provided, which are screwed in completely until they abut the caps 11 and 11', thus rigidly fixing the screws.

From the above it is seen that the safety valve according to the invention provides a displaceable means in the form of body 4, which assumes a normal balanced position when the pressures at the outlets are equal and which is moved to one of two displaced positions when the pressure at one of the outlets becomes less than the pressure at the other of the outlets. The displaceable means in the displaced positions closes the outlet of reduced pressure while leaving the other outlet open. The devices 15, 15' serve as elements of an indicator means which is activated in response to displacement of the displaceable means to signal the closing of the particular outlet which is closed by the displaceable means. The co-action of the stems 17, 17' with the recesses 5 and 5' respectively, serves to sense the direction of displacement of the piston 4, in order to be able to indicate which particular outlet has been closed by the piston 4. The stems also serve the additional function of immobilizing the piston 4 in its displaced position in which one of the outlets is closed.

When the valve is installed in motor vehicles, airplanes, electric cars, trains, etc., it is desirable to initially bleed the cylindrical body and optionally the tubing connected to the outlet channels.

The bleeding of the cylindrical body is effected by opening the bleeder screw 14 one-half to three-quarters of a turn, and the tubings are bled by completely screwing in the fastening screws 12, 12' which thereby fix the piston 4 in the normal position, thus permitting the bleeding of brakes by bleeding one wheel after another.

When the bleeding operation is completed, these screws are returned to their original retracted positions, and the safety valve is ready to act when damage occurs.

It is to be noted lastly, that the safety valve of the present invention combines various advantages, of which the following, among others, are enumerated:

It is simple and of practically unlimited duration, since it contains no rubber parts or materials which may deteriorate in time and on contact with the hydraulic fluid;

It does not offer any resistance to the braking or to the free circulation of the fluid, and does not influence the utilization devices as long as there is no damage;

All wheels remain perfectly compensated and balanced, because no line is cut off except in case of failure of one of them;

It fulfills its function under all conditions that a vehicle may be subjected to, and it insures continuous control of the brakes;

Its installation in vehicles is extremely simple, requiring little time, and not requiring any change in the brake or other lines;

The bleeding operations to be performed in hydraulic lines are unchanged, so that no additional operations are necessary;

It requires no maintenance;

It is of simple manufacture and moderate cost;

It is as effective in hydraulic systems as in compressed air or vacuum systems;

By its nature it is applicable to all systems of hydraulic control, of compressed air or vacuum, not only in motor vehicles but also in airplanes, ships, railroad trains, locomotives, trolley buses, industrial installations, etc.

It is further applicable, with excellent results, to conjugated suspension lines.

What is claimed is:

1. A safety valve comprising a body having an inlet for a pressure fluid and two outlets for the pressure fluid, said outlets being adapted for connection with utilization devices for the pressure fluid, said body having passageways for the flow of pressure fluid from said inlet to the outlets, displaceable means in said body subjected to the pressure of the fluid at said outlets to assume a normal balanced position when the pressures are equal and to be moved to one of two displaced positions when the pressure at one of said outlets becomes less than the pressure at the other of the outlets, said displaceable means, in said displaced positions, closing the outlet of reduced pressure, while leaving the other outlet open, indicator means responsive to the displacement of the displaceable means to signal the closing of an outlet, means mounted in said body for displacing said displaceable means to its balanced position and to hold it in said position whereby bleeding of the system can be effected, said displaceable means being a piston which is slidably mounted in said body, said piston having opposite ends, said means for displacing and holding the piston in its balanced position comprising displaceable members in said body engageable with said piston at its ends to displace the piston therewith, each displaceable member having a retracted and advanced position, the displaceable member in the retracted position being spaced from the associated end of the piston to permit the same to be displaced under the action of the unbalanced pressures at said outlets, whereas in the extended position the displaceable member is in contact with the piston to hold the same in its balanced position, each said displaceable member including two cone-shaped members having facing bases, the cone-shaped members engaging respective seats to define the retracted and advanced positions of the associated displaceable member.

2. A valve as claimed in claim 1 wherein said indicator means is coupled to said displaceable means to sense the direction of displacement thereof and indicate the particular outlet which is closed by the displaceable means.

3. A valve as claimed in claim 1 further comprising spring means acting on said piston to maintain the piston in said balanced position when the pressure of the fluid at the outlets is equal.

4. A valve as claimed in claim 3 wherein said piston includes a cone-shaped projection at each end pivotably coupled to the piston, said body having a conical seat at each outlet for receiving an associated projection upon displacement of the piston and closure of the outlet.

5. A valve as claimed in claim 4 comprising means coupling each cone-shaped projection to the piston for adjustment comprising an adjustable member threadably engaged in the piston and engaging the associated projection to permit pivotable movement thereof while limiting axial displacement of the projection to prevent removal thereof, and a spring interposed between said projection and piston to urge the projection to its limit position of axial displacement.

6. A valve as claimed in claim 2 wherein said indicator means comprises a pair of electromechanical devices mounted on said body, each device including a spring loaded stem urged against the piston, the latter being provided with a pair of recesses one of which is engaged by a respective stem when the piston is moved to one of said displaced positions, the engagement of a stem in the recess serving to immobilize the piston in its displaced position.

7. A valve as claimed in claim 6 wherein each said electromechanical device includes a switch means which is open when the associated stem is out of its associated recess and is closed when it is engaged in such recess, the operation of said switch means controlling the signalling which indicates the closing of the associated outlet.

8. A valve as claimed in claim 7 wherein each said stem is electrically insulated, said switch means comprising a metal disc coupled to said stem for movement therewith and a fixed member which is contacted by the disc when the stem is engaged in its associated recess, whereby the switch means is closed.

9. A valve as claimed in claim 8 wherein the disc and fixed member of each switch means have contacting surfaces with concentric annular recesses of sawtooth profile with teeth of acute angle.

10. A valve as claimed in claim 8 wherein said fixed member of each switch means has a bore for the passage therethrough of the associated stem, said fixed member having two holes symmetrically placed in spaced relation from said bore.

11. A valve as claimed in claim 1 further comprising a bleed screw mounted in said body in diametrically opposed relation with said inlet.

12. A valve as claimed in claim 1 wherein said displaceable members are threadably engaged in said body.

References Cited

UNITED STATES PATENTS

| | | | |
|---|---|---|---|
| 2,046,316 | 7/1936 | Bentz | 188—151 X |
| 2,650,863 | 9/1953 | Fore | 303—84 |
| 3,118,985 | 1/1964 | Feibush | 303—84 X |
| 3,358,097 | 12/1967 | Kersting | 188—151 X |
| 3,382,333 | 5/1968 | Ihnacik | 303—84 X |

MILTON BUCHLER, Primary Examiner

JOHN J. McLAUGHLIN, Jr., Assistant Examiner

U.S. Cl. X.R.

60—54.5; 137—118; 188—151; 200—82